_United States Patent Office_

2,884,431
Patented Apr. 28, 1959

2,884,431

**FLUORINATED DIESTERS OF PHOSPHORO-
DITHIOIC ACID AND SALTS THEREOF**

John O. Smith, Jr., North Plainfield, and John V. Clarke, Jr., Cranford, N.J., assignors to Esso Research and Engineering Company, a corporation of Delaware No Drawing. Application June 8, 1956
Serial No. 590,110

11 Claims. (Cl. 260—429.9)

This invention relates to lubricating compositions and additives therefor. Particularly, the invention relates to a lubricant additive imparting improved anti-wear properties formed by fluorination of organic substituted dithiophosphates, the process for producing such additives, and the use of such fluorinated compounds in lubricating compositions.

The use of organo dithiophosphates as additives is well known. These materials are commonly used in lubricating compositions, such as motor oils, because of their properties as detergents, anti-wear, anti-corrosion and anti-sludge forming agents. These materials are valuable for use in the crankcases of passenger automobiles and in buses, trucks, etc. in heavy duty service.

It has now been found, and forms the subject of the present invention, that the anti-wear properties of organo dithiophosphate additives may be greatly improved by the incorporation of a small amount of fluorine into the compound. Because of the greater stability of the fluorine to carbon bonds, the action of fluorine is unique and similar results would not be obtained by the use of other halogens such as chlorine. It has been found that these materials, when fluorinated so as to contain about 0.01 to 1.0 wt. percent, and preferably 0.05 to 0.5 wt. percent, of chemically combined fluorine, will be materially improved in their anti-wear properties without adversely affecting their other desirable properties. The fluorinated additive materials of this invention may be used wherever the organo dithiophosphate type of compounds have normally been used.

The dithiophosphates used in the practice of this invention have the general formula:

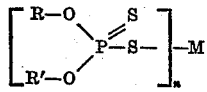

wherein, R and R' are radicals which may be the same or which may differ and are radicals each having about 2 to 20 carbon atoms and each is selected from the group consisting of aryl, alkyl, aralkyl, cycloalkyl, aryloxyalkyl, acylaryl and alkoxyaryl radicals; M is hydrogen or a salt-forming metal; and $n$ is the valence of M. More specifically, compounds of this class include the dialkyl dithiophosphates such as dibutyl dithiophosphate, dihexyl dithiophosphate, di n-octyl dithiophosphate, dicapryl dithiophosphate, dilauryl dithiophosphate, dioctadecyl dithiophosphate, etc. We prefer to use those dialkyl dithiophosphates in which the alkyl groups average from 5 to 20 carbon atoms in order to insure adequate solubility of the dihtiophosphates in lubricating oils. The diaryl dithiophosphates, and particularly the diaryl dithiophosphates in which the aryl group bears an alkyl, alkoxy or cycloaliphatic group, are also useful, such as for example, diphenyl dithiophosphate, di-(2,4-diamyl phenyl) dithiophosphate, dikerylphenyl dithiophosphate (a product obtained by treating chlorinated kerosene with a phenol in the presence of aluminum chloride and then reacting with $P_2S_5$) and the various di-(wax substituted aryl) dithiophosphates. Dicycloaliphatic dithiophosphates may also be employed, such as those prepared by reacting cyclopentanol, cyclohexanol, cycloheptanol, and methyl, ethyl, propyl, and amyl substituted cyclopentanol, cyclohexanol and cycloheptanol, etc. with $P_2S_5$. The diaryloxyalkyl dithiophosphates such as di(2,4-diamyl phenoxyethyl) dithiophosphate, the diacylaryl dithiophosphates such as di-(lauroyl phenyl) dithiophosphate and the dialkoxyaryl dithiophosphates such as di-(methoxyphenyl) dithiophosphate, may also be employed. The above dithiophosphate materials and their preparation are known in the art (e.g. see U.S. Patent 2,369,632).

The dialkyl dithiophosphates are preferred because they have greater load carrying ability, are better inhibitors, better detergents and are less viscous than other dithiophosphates. Especially preferred are those dialkyl dithiophosphates in which each alkyl group contains between 3 and 6 carbon atoms such that the average of all the carbons in both groups is at least 5. These alkyl groups include isopropyl, n-propyl, isobutyl, n-butyl and tertiary butyl, n-pentyl, isopentyl, sec. pentyl, tert. pentyl, n-hexyl and 1,4-dimethyl-butyl. The two alkyl groups may be the same or may be different groups.

We also prefer to employ these various organic substituted dithiophosphates in the form of their metal salts. Among the various metal salts which may be employed are those of the salt-forming radicals such as iron, nickel, aluminum, cadmium, tin, zinc, magnesium, calcium, strontium, barium and others. Especially preferred are the iron, barium and zinc salts because these salts have been found to be more effective even in the unfluorinated state.

The fluorinating agent is preferably cobalt trifluoride having the formula $CoF_3$, which is a mild fluorinating compound, although other mild fluorinating compounds may be used, such as silver difluoride, $AgF_2$; manganic fluoride, $MnF_3$; lead tetrafluoride, $PbF_4$; ceric fluoride, $CeF_4$; bismuth pentafluoride, $BiF_5$; thallium fluoride $TlF_3$. Cobalt trifluoride is especially preferred as it is somewhat less active than others such as silver difluoride, for example, and thus gives less fluorination under equivalent conditions of temperature and pressure.

Other common fluorinating compounds such as fluorine gas; HF; antimony fluoride, $SbF_3$; mercuric fluoride, $HgF_2$; are not satisfactory since their action is quite violent which would cause excessive fluorination which would give rise to hydrocarbon insoluble products and would often cause degradation of the starting material to a variety of undesirable products. They would therefore not produce the same effects or the same type compound obtained by the method of this invention using a mild fluorinating agent.

The fluorination may be carried out in the presence of a diluent oil for the purpose of ease of handling or because of the commercial availability of dithiophosphates in a diluent oil, in which form they are customarily supplied. Suitable diluent oils are any paraffinic hydrocarbons in which the material to be fluorinated is soluble and which have a boiling point above 400° F., the maximum temperature at which the fluorination is carried out.

However, the process can also be carried out without using a diluent oil by directly reacting the dithiophosphate and the fluorination agent.

In carrying out the fluorination reaction, about 0.1 to 2.0 mols (e.g. 0.5 to 2.0 mols) of the mild fluorinating agent are reacted per mol of the dithiophosphate at a temperature and for a time sufficient to incorporate about .01 to 1.0 wt. percent of fluorine into the dithiophosphate. The reaction may be carried out at temperatures within the range of about 300° to 450° F., preferably about 375° to 400° F. for a period of time of about 2 to 5 hours, and preferably about 3 to 4 hours. The reaction is carried out under an inert atmosphere, such as nitrogen blanket in order to exclude oxygen and thereby prevent oxidative degradation. The reaction is indicated as completed by the cessation of gas evolution from the reaction mixture.

The reaction mixture may then be diluted with an inert solvent such as hexane, heptane, benzene or toluene in order to extract the fluorinated product from the insoluble materials such as $CoF_2$ and unreacted $CoF_3$, followed by filtering in order to remove any unreacted materials or impurities. The solvent is then removed by evaporation to leave the purified product.

Although the exact nature of the chemical reaction is not understood, it is believed that the fluorine is mainly substituted for hydrogen in either or both alkyl groups. It may also to some degree replace some of the sulfur atoms in the dithiophosphate structure. The invention will be more clearly understood by reference to the following examples.

Example I

Sixty grams of a mixture consisting of 55% by weight of zinc dialkyl dithiophosphate (of which the alkyl groups are 1,4-dimethyl butyl) and 45% by weight of a mineral diluent oil which is a solvent extracted paraffinic distillate having a V.I. of 105 and a viscosity at 100° F. of 150 S.U.S., are added to a nickel beaker. Eleven grams of cobalt trifluoride, which is a powder, is then added to the beaker. Nitrogen gas is used as an atmosphere above the beaker in order to exclude air and thus prevent oxidative degradation. The mixture is heated in a sand bath to a temperature of about 380° F. at which point the reaction begins as evidenced by gas evolution from the reaction mixture. The reaction mixture is then maintained at a temperature of about 380° F. for about 2 hours while stirring. At the end of this time, the reaction mixture is allowed to cool and the product is dissolved in 100 cc. of hexane and then filtered through a filter paper. The hexane is then removed by evaporation by heating the solution over a steam bath until the hexane is completely removed. The resulting product consists of 55 wt. percent of the fluorinated zinc dialkyl dithiophosphate and 45 wt. percent of the original diluent oil.

Example II

A fluorinated dithiophosphate of the type of Example I may be prepared directly without the use of a diluent oil. This compound would be prepared by the following procedure:

Sixty grams of the zinc di(1,4-dimethyl butyl) dithiophosphate and 6 grams of cobalt trifluoride are added to a nickel beaker. The mixture is heated in a sand bath to a temperature of about 380° F. and is maintained at this temperature under a nitrogen blanket for about 2 hours while stirring. The reaction mixture is cooled and the product is dissolved in about 100 cc. of hexane and filtered through filter paper. The hexane is removed by heating the solution over a steam bath until the hexane is completely evaporated.

The fluorinated product may be used as an additive in amounts of 0.001 to 10.0 wt. percent (e.g., 0.01 to 3.0 wt. percent) preferably 0.5 to 30 wt. percent, based on the weight of the total composition, in a major proportion of either mineral base lubricating oils or various synthetic oils.

Mineral base lubricating oils ranging in viscosity from about 3 to about 1000 S.S.U. at 100° F. are preferably employed as the base oils for the compositions of the invention. These naturally occurring mineral lubricating oils may be derived from any petroleum crude source, whether paraffinic or naphthenic in type, and may be refined by any of the known refining techniques of the petroleum industry.

The invention is not limited, however, to the use of mineral base oils, since various synthetic oils having at least 30 Saybolt Universal seconds viscosity at 100° F. may also be used as part or all of the base oils. Examples of operable synthetic lubricating oils include ether alcohols, such as those corresponding to the general formula:

$$RO(C_nH_{2n}O)_xH$$

wherein R is an alkyl group, $n$ is an integer from 2 to 5, and $x$ is an integer from 1 to 40, e.g., the mono-butyl ether of tetradeca-propylene glycol, esters of monobasic carboxylic acids, totaling 20 to 80 carbon atoms, such as those of $C_4$ to $C_{18}$ aliphatic acids with $C_4$ to $C_{18}$ aliphatic alcohols, the $C_4$ to $C_{18}$ radicals including the butyl, isobutyl, hexyl, octyl, iso-octyl, 2-ethyl hexyl, nonyl, decyl, lauryl, stearyl and similar radicals; diesters of dibasic acids, such as adipic or sebacic acid with monohydric alcohols, such as hexyl, octyl, 2-ethyl hexyl or higher alcohols; esters of polyethylene glycols with $C_8$ to $C_{18}$ branched-chain carboxylic acids; complex esters of polybasic carboxylic acids, polyhydric alcohols, and monobasic acids and/or monohydric alcohols, such as the glycol-centered or dibasic acid-centered complex esters; phosphoric acid esters or thioesters of aliphatic alcohols or mercaptans of up to about 18 carbon atoms; halocarbon oils, such as the polymers of chlorofluoro alkylenes like chlorotrifluoroethylene; organo-siloxanes; sulfite esters, organic carbonates; mercaptals; formals; etc.

Other additives may also be added to the composition such as viscosity index improvers, such as the polymethacrylate esters, fumarate-vinyl acetate copolymers, maleate-vinyl acetate copolymers, polyalkyl styrenes, and the like. The viscosity index improver may be used in amounts in the range of about 0.1 to 30% by weight, preferably about 0.1 to 10% by weight, and more preferably about 0.1 to 5% by weight, based on the finished lubricating oil. Mixtures of various types of V.I. improvers may be used.

A small amount of a pour point depressant additive may also be incorporated in the finished composition to obtain improved pour-point stability and decreased pour point. Such pour point depressants include condensation products of chlorinated wax with naphthalene or phenol, various polymers and copolymers of unsaturated esters and the like. For example, a copolymer of the fumaric acid esters of coconut oils and of vinyl acetate in an 80/20 weight ratio is effective when used in concentrations of about 0.01 to 5% by weight based on the weight of the base oil.

Other suitable additives which may be incorporated in the finished composition are oxidation inhibitors such as phenothiazine, lauryl selenide, phenyl alpha-naphthylamine; rust inhibitors such as lecithin, metal salts of petroleum or synthetic sulfonic acids, sorbitan monooleate, lauryl mercapto acetic acid; detergents such as the barium salt of isononyl phenol sulfide and calcium petroleum or synthetic sulfonates; corrosion resisting agents such as di-2-ethylhexylamine, and other additives.

Example III

Blends can be prepared which consist of 2 wt. percent of the fluorinated product of Example I (fluorinated mixture of 55 wt. percent of zinc di-(1,4-dimethyl butyl) dithiophosphate and 45 wt. percent diluent oil); and 98 wt. percent of a base oil which is a high quality paraffinic mineral lubricating oil distillate having a viscosity index of about 100.

Blends can be also prepared of the unfluorinated additive which are similar to the blends described above except that the zinc di-(1,4-dimethyl butyl) dithiophosphate is not fluorinated.

The above blends are tested in a Shell 4-ball E.P. tester. This test is carried out as follows:

The test lubricant is placed in the cup of the machine at room temperature. This cup also contains three steel balls which are fixed in position by a screw cap. A fourth steel ball, held in a chuck, is pressed against the three lower balls with a known force and is rotated at 1800 revolutions per minute. One minute tests are run at increasing load increments using a new set of balls for each load. Using this procedure, the maximum load that can be carried without metal scuffing or film failure is determined.

The blends containing the fluorinated additive and the unfluorinated additive can be subjected to the copper strip corrosion test for petroleum products (ASTM Method D-130. Both blends have little effect on copper, and give no appreciable visible amount of discoloration of the copper strip, which is equivalent to a J-2 rating in said ASTM test.

These blends can be also subjected to an oxidation test which is carried out as follows:

The oil sample is heated to 340° F. in a glass tube and is exposed to oxidation by a stream of air passing through it. A copper-lead test bearing is mounted on a shaft and rotated in the oil. After given periods, the bearing is removed, repolished, and replaced in the oil. The viscosity of the oil is determined at the end of each period. The first period lasts for 8 hours, and each subsequent period is for 4 hours, for a total of 20 hours. The lower the viscosity increase, the better the oil.

In accordance with the present invention fluorinating the zinc dialkyl dithiophosphate greatly improves the load carrying ability of the compound without adversely affecting its other desirable properties as an additive. This result was surprising as fluorination of other materials had no effect on their load carrying ability. For example, the diluent oil per se of Example I was fluorinated to contain about 0.1 wt. percent fluorine and had a load carrying ability in the Shell 4-ball test of 60 kg. before fluorination and 58 kg. after fluorination. The fluorination of other additive materials such as a methacrylate polymer of about 20,000 mol. wt.; a polybutene polymer of about 20,000 mol. wt.; a calcium salt of an oil soluble sulfonate; and a barium salt of an alkyl phenol sulfide had no effect on the load carrying ability of these additives. Also the viscosity increase of the oil upon oxidation, was significantly reduced by the presence of the fluorinated dithiophosphate.

What is claimed is:

1. As a new composition of matter, a fluorinated organo dithiophosphate containing about 0.01 to 1.0 wt. percent of chemically combined fluorine, wherein said organo dithiophosphate has the general formula:

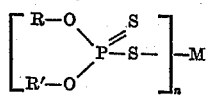

wherein R and R' are radicals each having about 2 to 20 carbon atoms and are each selected from the group consisting of aryl, alkyl, aralkyl, cycloalkyl, aryloxyalkyl, acylaryl and alkoxyaryl radicals; M is a member selected from the group consisting of hydrogen and a salt forming metal and n is the valence of M.

2. A composition according to claim 1, wherein R and R' are alkyl radicals and M represents a salt forming metal.

3. A composition according to claim 1, wherein R and R' are alkyl groups containing 5 to 20 carbon atoms each and M represents a salt forming metal.

4. A composition according to claim 1, wherein said organo dithiophosphate is a zinc dialkyl dithiophosphate.

5. As a new composition of matter a fluorinated zinc di-(1,4-dimethyl butyl) dithiophosphate having a fluorine content of about 0.1 wt. percent.

6. A process for mildly fluorinating an organo dithiophosphate which comprises reacting (1) a dithiophosphate having the general formula:

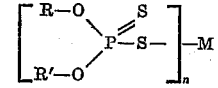

wherein R and R' are radicals each having about 2 to 20 carbon atoms and are each selected from the group consisting of aryl, alkyl, aralkyl, cycloalkyl, aryloxyalkyl, acylaryl and alkoxyaryl radicals; M is a member selected from the group consisting of hydrogen and a salt forming metal, and n is the valence of M, with (2) a mild fluorinating agent to form a fluorinated organo dithiophosphate reaction product having a fluorine content of about 0.01 to 1.0 wt. percent.

7. A process according to claim 6, wherein said mild fluorinating agent is cobalt trifluoride.

8. A process according to claim 6, wherein said dithiophosphate is a metal dialkyl dithiophosphate.

9. A process according to claim 8, wherein said metal dialkyl dithiophosphate is a zinc di-(1,4-dimethyl butyl) dithiophosphate.

10. A process according to claim 6 wherein about 0.1 to 2.0 mols of said fluorinating agent are reacted with one mol of said dipthiophosphate at a temperature and for a time sufficient to incorporate about .01 to 1.0 wt. percent of fluorine into said dithiophosphate.

11. A process according to claim 10, wherein said temperature is about 300 to 450° F. and said time is about 2 to 5 hours.

References Cited in the file of this patent

UNITED STATES PATENTS

| | | |
|---|---|---|
| 2,452,319 | Patterson et al. | Oct. 26, 1948 |
| 2,494,283 | Cassaday et al. | Jan. 10, 1950 |
| 2,614,990 | Harman et al. | Oct. 21, 1952 |
| 2,622,096 | Ladd | Dec. 16, 1952 |